(12) United States Patent
Harris et al.

(10) Patent No.: US 11,893,095 B2
(45) Date of Patent: Feb. 6, 2024

(54) GRAPHICAL USER INTERFACE ENVIRONMENT PROVIDING A UNIFIED ENTERPRISE DIGITAL DESKTOP PLATFORM

(71) Applicant: Bank of America Corporation, Charlotte, NC (US)

(72) Inventors: Julie S. Harris, Mount Holly, NC (US); Sidhartha Kaw, Waxhaw, NC (US); Jinna Zevulun Kim, Charlotte, NC (US); Eileen Donlevy Bridges, Fort Mill, SC (US); Vishwas Korde, Matthews, NC (US); Ashley Nicole Camack, Bronx, NY (US); Karli Kuhn, Charlotte, NC (US); John George Ingham, Cos Cob, CT (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 771 days.

(21) Appl. No.: 16/822,608

(22) Filed: Mar. 18, 2020

(65) Prior Publication Data

US 2020/0302038 A1 Sep. 24, 2020

Related U.S. Application Data

(60) Provisional application No. 62/820,080, filed on Mar. 18, 2019.

(51) Int. Cl.
*G06F 21/31* (2013.01)
*G06Q 10/10* (2023.01)
*G06F 11/32* (2006.01)

(52) U.S. Cl.
CPC ............ *G06F 21/31* (2013.01); *G06F 11/327* (2013.01); *G06Q 10/10* (2013.01)

(58) Field of Classification Search
CPC ........ G06F 21/31; G06F 11/327; G06Q 10/10
See application file for complete search history.

(56) References Cited

U.S. PATENT DOCUMENTS 7,003,560 B1 * 2/2006 Mullen .................. G06Q 10/06
709/224
7,010,755 B2 3/2006 Anderson et al.
(Continued)

FOREIGN PATENT DOCUMENTS

JP H06250911 A 9/1944

*Primary Examiner* — Rami R Okasha
(74) *Attorney, Agent, or Firm* — Moore & Van Allen PLLC; Lauren M. Stokes

(57) ABSTRACT

Embodiments of the present invention provide a specified graphical user interface providing a unified enterprise digital desktop platform. The system may include the identification of two or more enterprise applications associated with a particular enterprise. The system can then identify a user associated with the enterprise. Next, the system may determine a relevancy value for each of the two or more enterprise applications with respect to the identified user. At least one computing device associated with the user may be caused to display information in the specified graphical user interface associated with the two or more enterprise applications as a unified digital desktop application. The system can then determine that a triggering event associated with one of the enterprise applications is occurring and, in response, cause the computing device to display an alert notification in the specified graphical user interface.

20 Claims, 13 Drawing Sheets

(56) References Cited

U.S. PATENT DOCUMENTS

| | | |
|---|---|---|
| 7,512,902 B2 | 3/2009 | Robertson et al. |
| 8,161,053 B1 | 4/2012 | Khan et al. |
| 8,302,026 B2 | 10/2012 | Wang et al. |
| 8,356,258 B2 | 1/2013 | Matthews |
| 9,542,202 B2 | 1/2017 | Ording |
| 9,645,732 B2 | 5/2017 | Butcher |
| 9,658,732 B2 | 5/2017 | Ording et al. |
| 9,721,112 B2* | 8/2017 | Tse .................. G06F 21/6218 |
| 10,152,192 B2 | 12/2018 | Ording et al. |
| 2002/0174000 A1 | 11/2002 | Katz et al. |
| 2004/0001101 A1 | 1/2004 | Trajkovic |
| 2004/0138936 A1* | 7/2004 | Johnson ............ G06Q 10/0639 |
| | | 705/7.38 |
| 2005/0004819 A1 | 1/2005 | Etzioni et al. |
| 2005/0071217 A1 | 3/2005 | Hoogs et al. |
| 2005/0102510 A1* | 5/2005 | Patrick ................ H04L 63/20 |
| | | 726/4 |
| 2007/0018953 A1 | 1/2007 | Kipersztok |
| 2007/0112635 A1 | 5/2007 | Loncaric |
| 2007/0150293 A1 | 6/2007 | Dagnino |
| 2010/0042445 A1* | 2/2010 | Nicosia ............... G06F 3/0482 |
| | | 715/810 |
| 2010/0269069 A1 | 10/2010 | Paila et al. |
| 2011/0126111 A1* | 5/2011 | Gill .................. G06F 21/577 |
| | | 715/736 |
| 2013/0036475 A1* | 2/2013 | Ramachandran ... G06F 21/6218 |
| | | 726/27 |
| 2013/0174263 A1* | 7/2013 | Nunez Di Croce ........................ |
| | | H04L 63/1433 |
| | | 726/25 |
| 2013/0268889 A1* | 10/2013 | Barak .................. G06F 3/0486 |
| | | 715/825 |
| 2014/0007183 A1* | 1/2014 | Qureshi ............. H04L 63/0428 |
| | | 726/1 |
| 2014/0143605 A1* | 5/2014 | Balla .................. G06F 9/44505 |
| | | 714/38.1 |
| 2014/0229407 A1* | 8/2014 | White .................... G06N 20/00 |
| | | 706/46 |
| 2014/0351370 A1* | 11/2014 | Ashley ................ H04L 67/148 |
| | | 709/217 |
| 2014/0365961 A1* | 12/2014 | Lefor ................ G06Q 10/0631 |
| | | 715/810 |
| 2015/0019559 A1* | 1/2015 | Maquaire .............. G06F 16/907 |
| | | 707/740 |
| 2015/0212700 A1* | 7/2015 | Mithal .................. G06Q 10/00 |
| | | 715/765 |
| 2015/0227283 A1 | 8/2015 | Luna et al. |
| 2015/0302338 A1* | 10/2015 | Zaveri ................ H04L 67/1001 |
| | | 705/7.39 |
| 2016/0055126 A1* | 2/2016 | Doerr ...................... G06F 8/38 |
| | | 715/745 |
| 2016/0259495 A1 | 9/2016 | Butcher et al. |
| 2016/0373588 A1* | 12/2016 | Raleigh .............. H04L 12/1407 |
| 2017/0286881 A1* | 10/2017 | Nayak .................... G06Q 10/10 |
| 2017/0330195 A1* | 11/2017 | Lange ................ G06F 3/04817 |
| 2017/0344218 A1* | 11/2017 | Jann .................... G06F 3/0483 |
| 2018/0285887 A1* | 10/2018 | Maung .................. G06Q 10/10 |

\* cited by examiner

1200

9:41

<

Card Management

Summary Data

Active Corporate Cards: VIEW

Monthly Spend: VIEW

Total Credit Limit: VIEW

VIEW CARD BENEFITS

ISSUE NEW CARDS

VIEW CARDHOLDERS

Feb 18 - Mar 18  ⌄

Transport
Hotels
Food
Air Travel
Rental Fees
Supplies

SEE THE BREAKDOWN

*Figure 12*

Explore the Potential.

Companies like yours have higher days payable.

Use the slider to see how extending your days payable could affect your cash position.

Want Even More Info?

Visit the resource center to see more days payable material.

RESOURCE CENTER

GRAPHICAL USER INTERFACE ENVIRONMENT PROVIDING A UNIFIED ENTERPRISE DIGITAL DESKTOP PLATFORM

CROSS-REFERENCE TO RELATED APPLICATIONS

This application is a non-provisional application of and claims priority to U.S. Provisional Application No. 62/820,080, filed on Mar. 18, 2019; the contents of which are also incorporated herein by reference.

BACKGROUND

Enterprises can involve complex structures where multiple users within the enterprise are provided with different permissions, tasks, and entitlements. These complex structures can cause confusion, miscommunication, and a lack of visibility for entitlements and security measures. Providing a graphical user interface environment with a unified digital desktop platform across the enterprise with specialized interfaces for individual users simplifies communications and multi-user tasks, while providing a holistic and real-time view of security measures for the enterprise.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing a graphical user interface for providing a unified digital desktop platform. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve identifying two or more enterprise applications associated with an enterprise. The system may then identify a user associated with the enterprise. The system may then determine a relevancy value for each of the two or more enterprise applications with respect to the identified user. Furthermore, the system may cause at least one computing device associated with the user to display information associated with the two or more enterprise applications as a unified digital desktop application. In some embodiments, the system may determine the occurrence of an alert triggering event associated with the two or more enterprise applications associated with the enterprise. In response to determining the occurrence of the alert triggering event, the system may cause the at least one computing device associated with the user to display an alert notification.

In one embodiment, the processing device is configured to execute computer-readable program code to transition views on the digital desktop to one of the two or more enterprise applications based on a selection by the user.

In one embodiment, at least one of the enterprise applications comprises an operation that requires that the user maintain an entitlement to perform the operation. In this embodiment, the processing device is configured to execute computer-readable program code that prompts the user to forward the entitlement to a second user, whereby the second user can perform the operation on behalf of the user.

In another embodiment, at least one of the enterprise applications comprises at least one operation and wherein said processing device is configured to execute computer-readable program code that prompts the user to forward the operation to a second user.

In some embodiments, at least one of the enterprise applications requires authentication for access by a user. The processing device is configured to execute computer-readable program code that, following authentication by the user using authentication information and upon request by the user, transmits a current session in which the user is using the operation to a second processing device, along with the authentication information.

In some embodiment, the processing device is configured to execute computer-readable program code that determines security status of one or more of said enterprise applications. In a further embodiment, the processing device is configured to execute computer-readable program code that determines whether at least one of said enterprise applications is in compliance with security requirements.

In one embodiment, the processing device is configured to execute computer-readable program code that predicts an outcome associated with a user implementing an operation of one or more of the enterprise applications.

In one embodiment, the processing device is configured to execute computer-readable program code that monitors operation of one or more of the enterprise applications and determines whether such enterprise application is in compliance with a set of compliance rules.

In one embodiment, the processing device is configured to execute computer-readable program code that allows a user to upload data in the form of documents for input into one or more of the enterprise applications.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
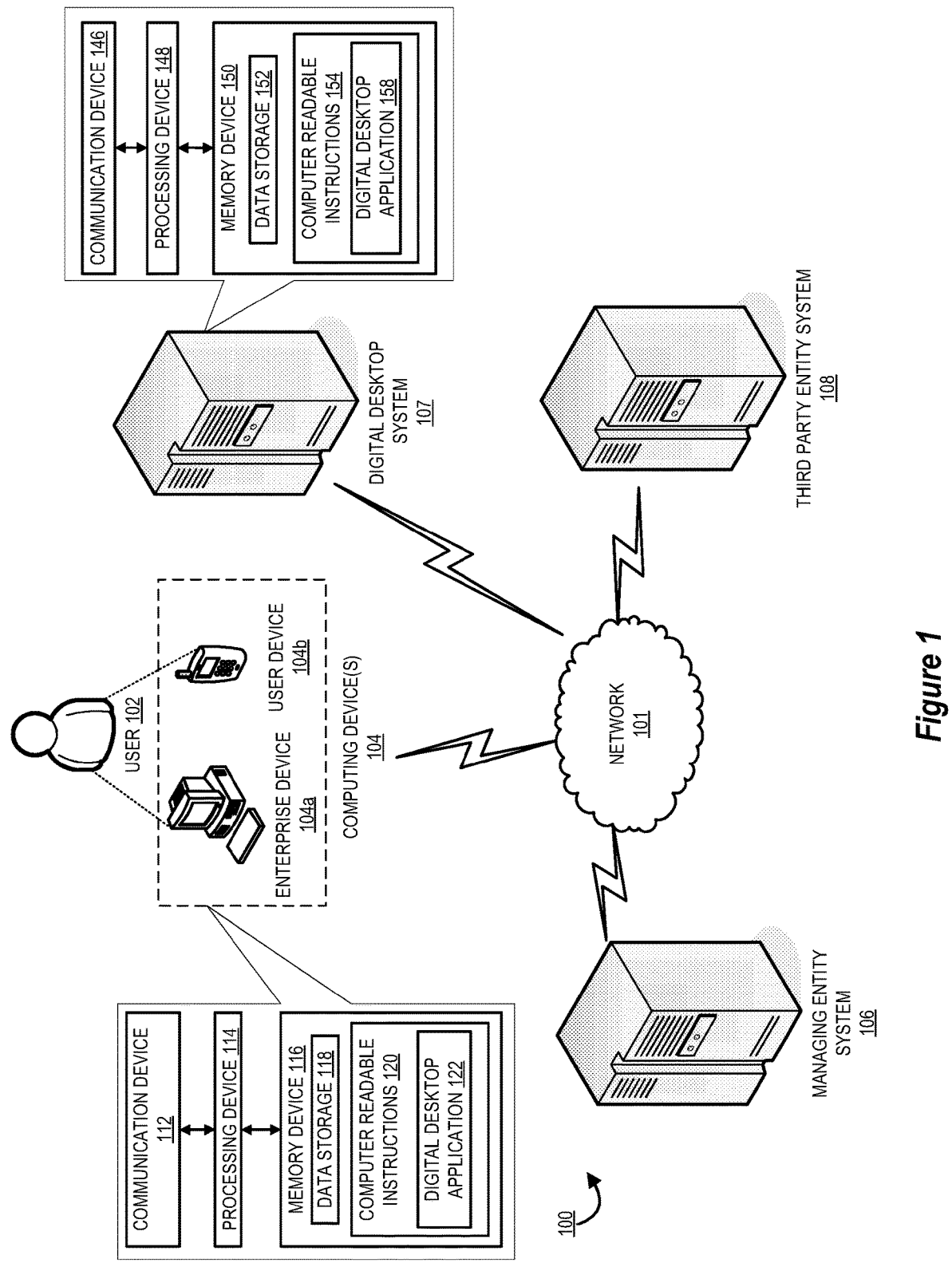
Figure 2:
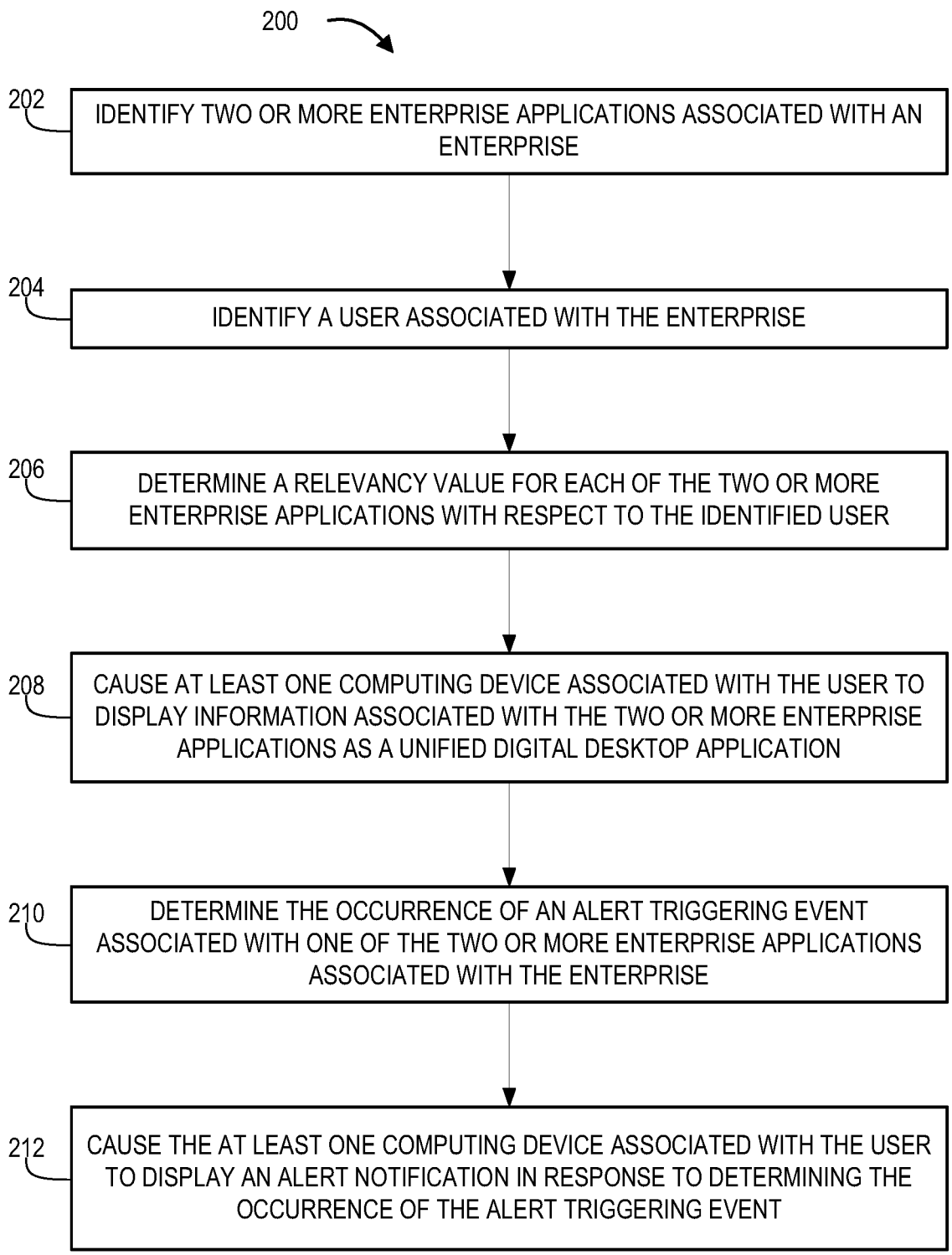
Figure 3:
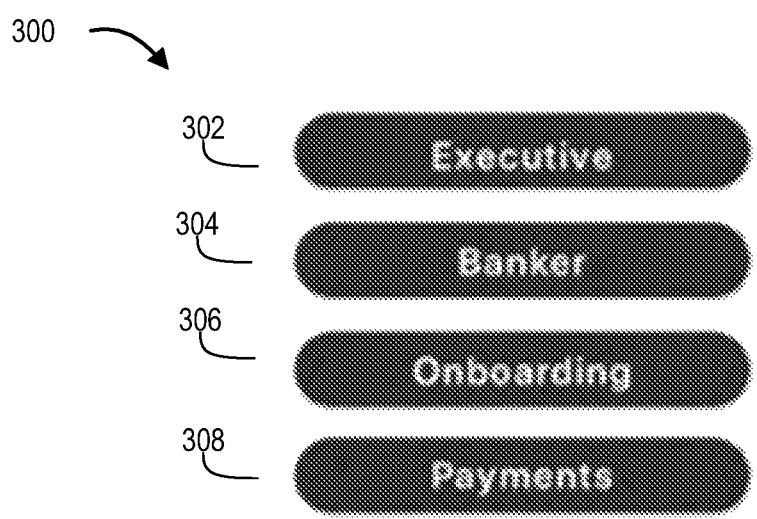

Having thus described embodiments of the invention in general terms, reference will now be made the accompanying drawings, wherein:

FIG. 1 provides a block diagram illustrating a system environment for providing a unified enterprise digital desktop platform, in accordance with an embodiment of the invention;

FIG. 2 provides high level process flow illustrating a process for providing a unified enterprise digital desktop platform, in accordance with an embodiment of the invention;

FIG. 3 illustrates an example view of a graphical interface 300 displaying enterprise applications according to one embodiment of the invention.

Figure 4:
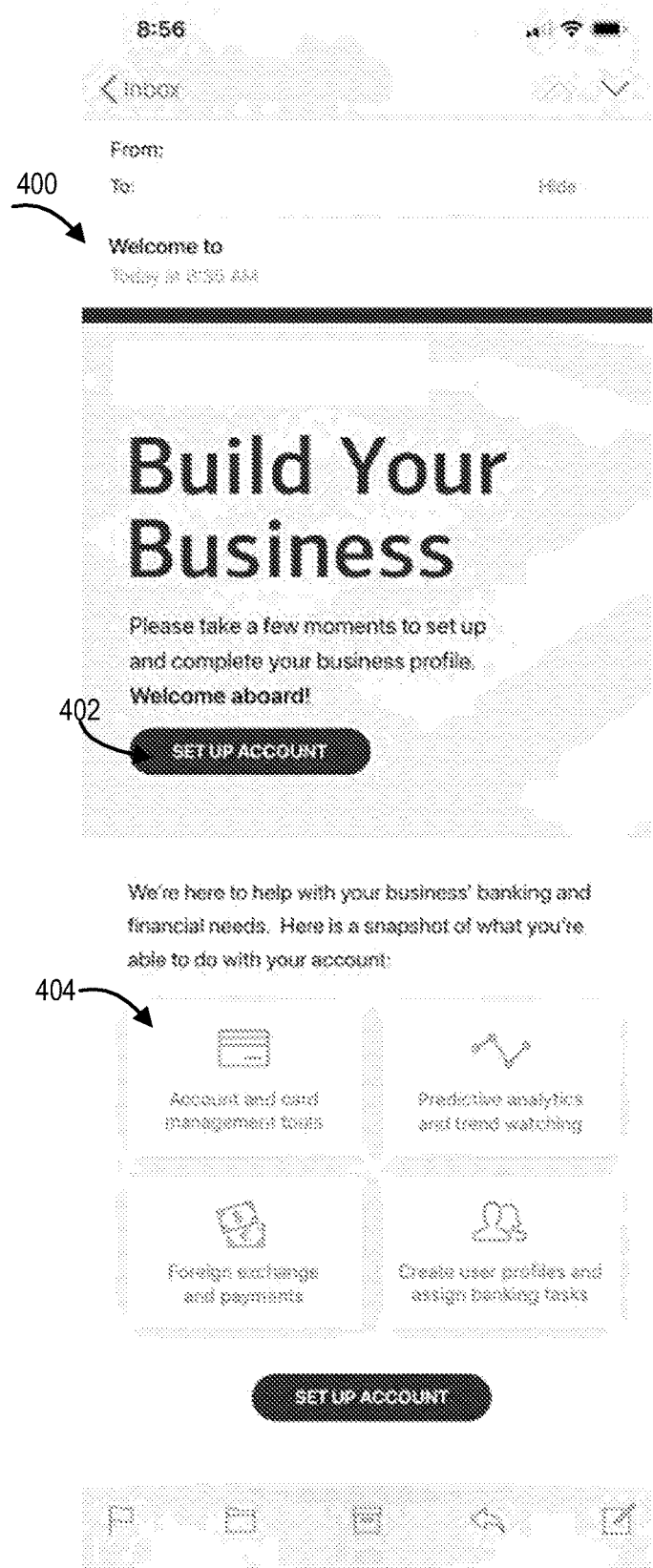

FIG. 4 illustrates a GUI that allows a user to set up an account and onboard various information according to one embodiment of the invention.

Figure 5:
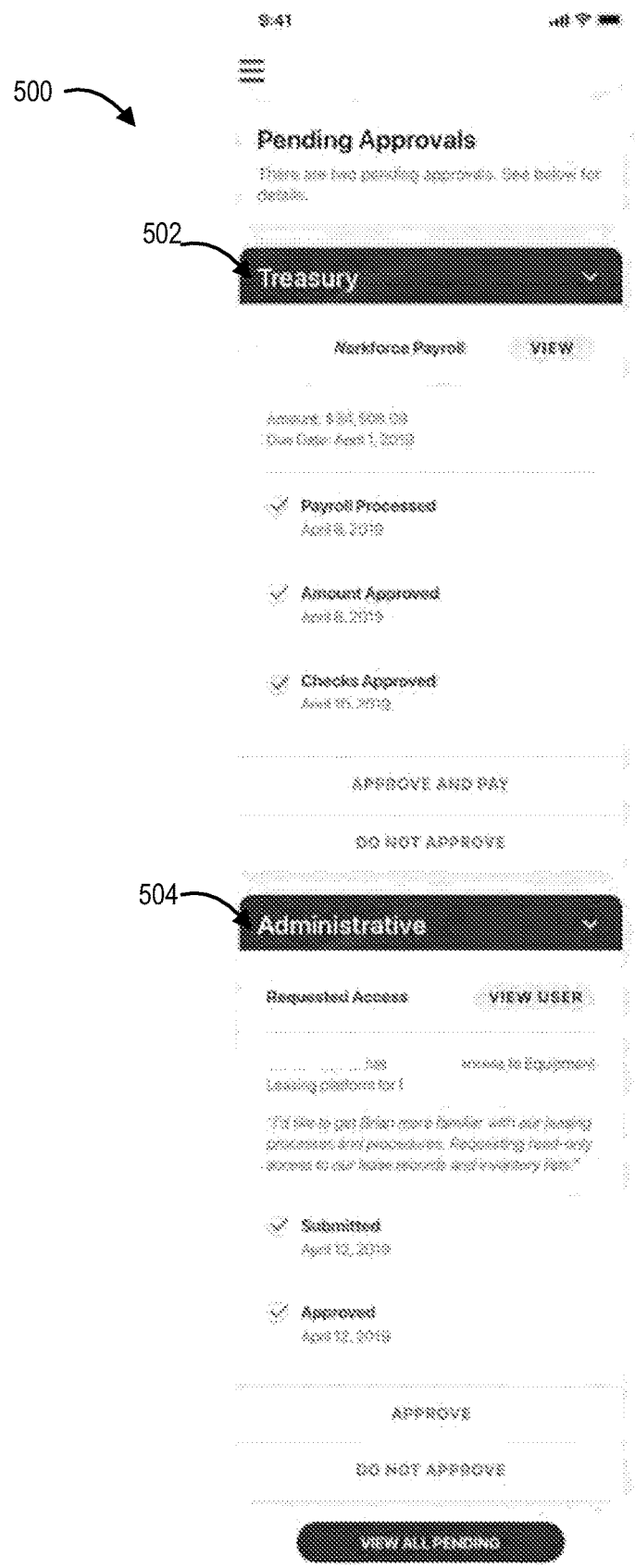

FIG. 5 illustrates a GUI that organizes various approvals associated with a user's business according to one embodiment of the invention.

Figure 6:
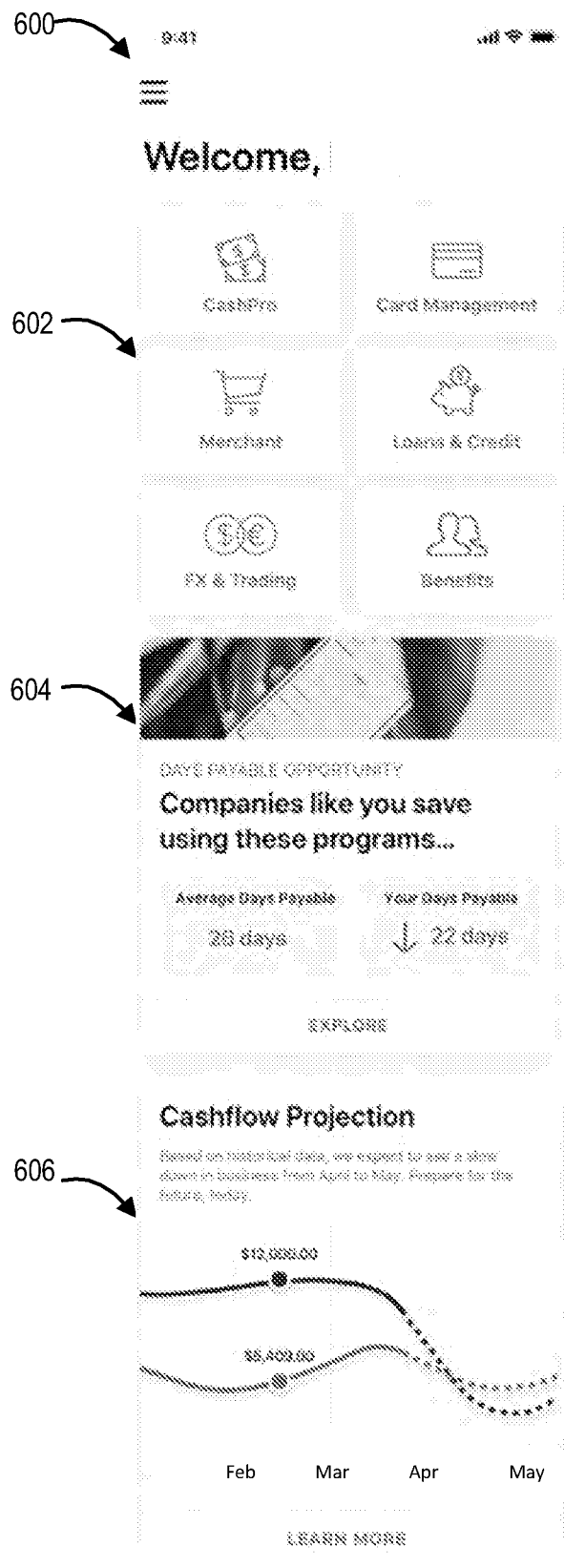

FIG. 6 illustrates a GUI organizing various applications associated with the user's business, according to one embodiment of the invention.

Figure 7:
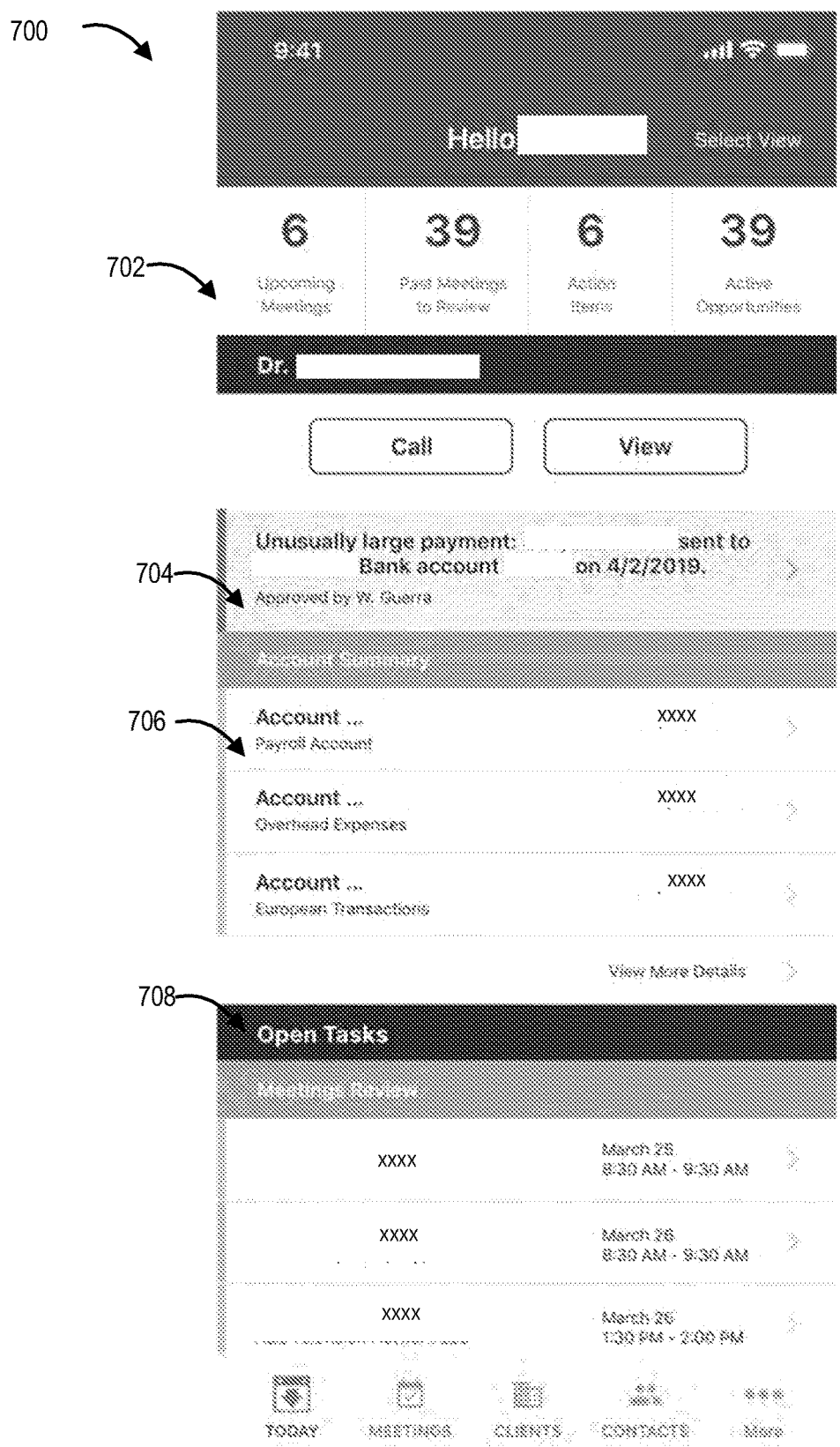

FIG. 7 illustrates a GUI for providing a user view into a series of task, alerts, and account information, according to one embodiment of the invention.

Figure 8:
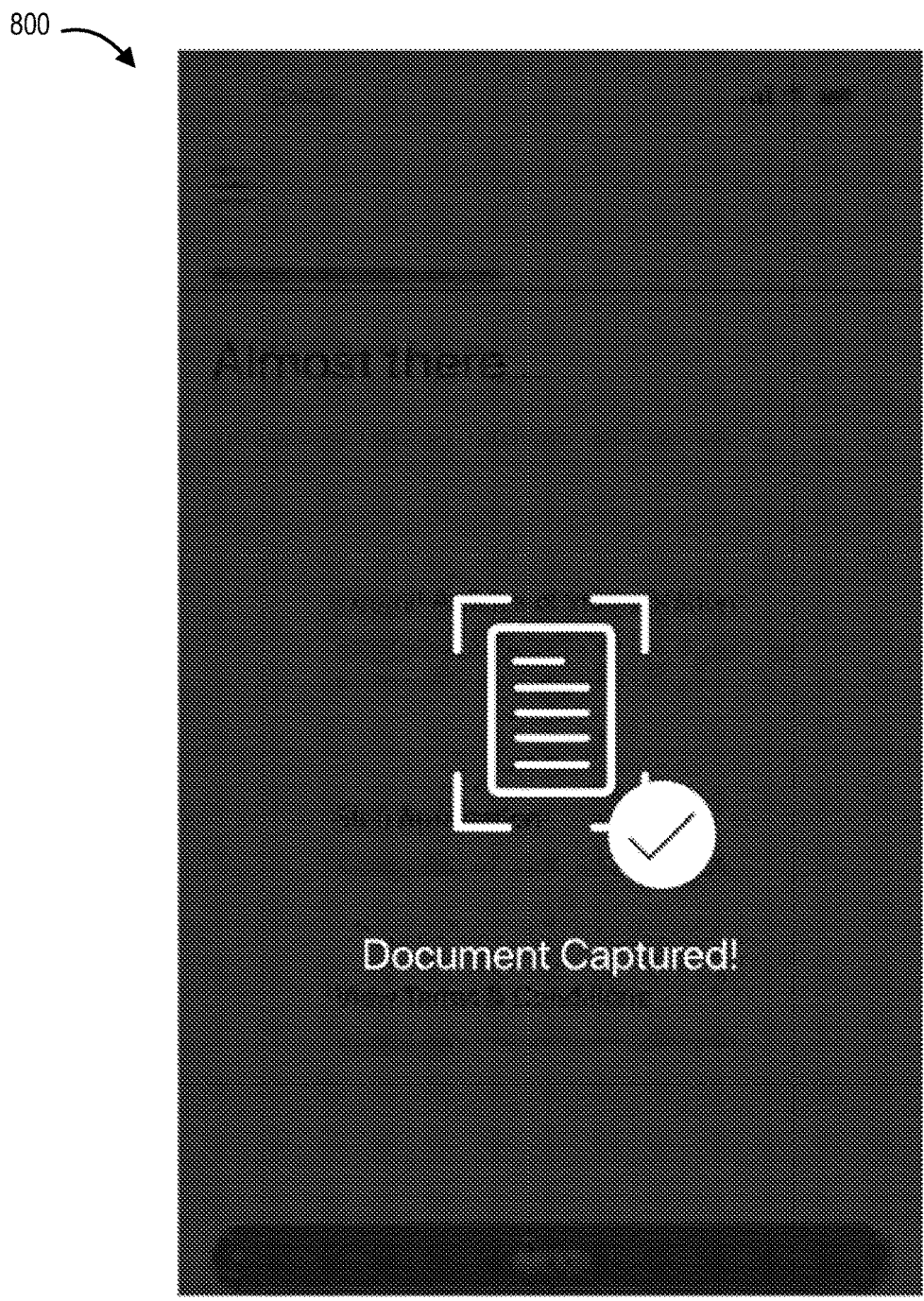
Figure 9:

FIGS. 8 and 9 illustrate GUIs for the user to capture documents via camera, according to one embodiment of the present invention.

Figure 10:
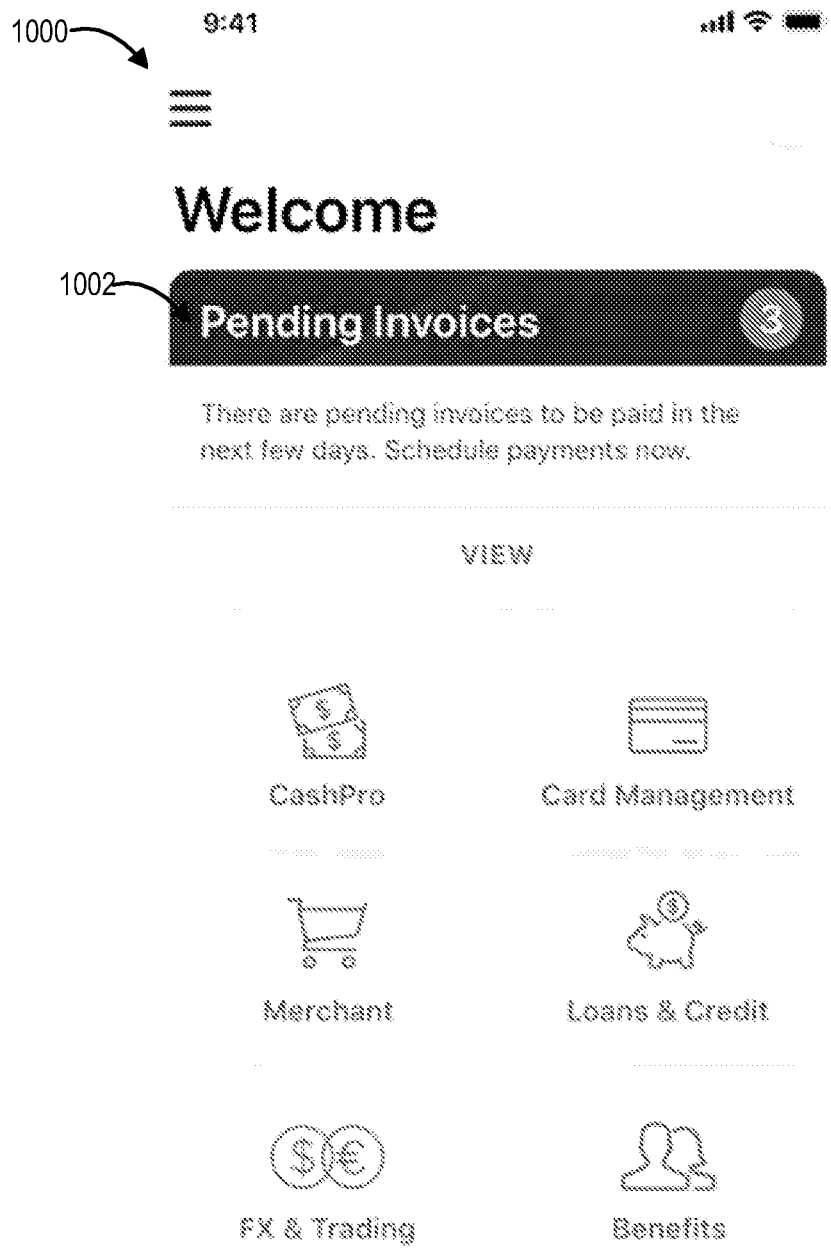

FIG. 10 illustrates a GUI for organizing various applications associated with the user's business, according to one embodiment of the present invention.

Figure 11:
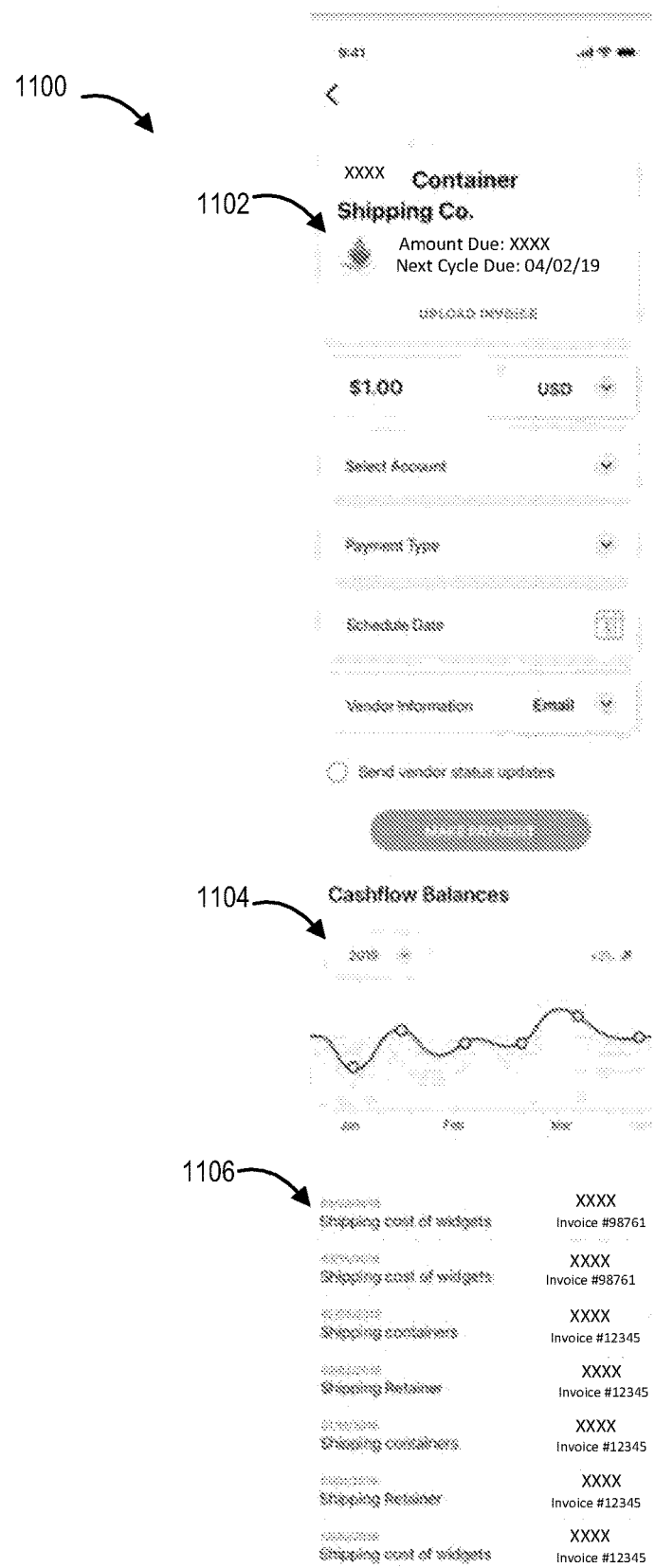

FIG. 11 illustrates a GUI that includes a payment scheduling window allowing a user to schedule payments, perform cash flow analysis, and business costs, according to one embodiment of the present invention.

FIG. 12 illustrates a GUI for card management tools, according to one embodiment of the present invention.

Figure 13:
Figure 13:
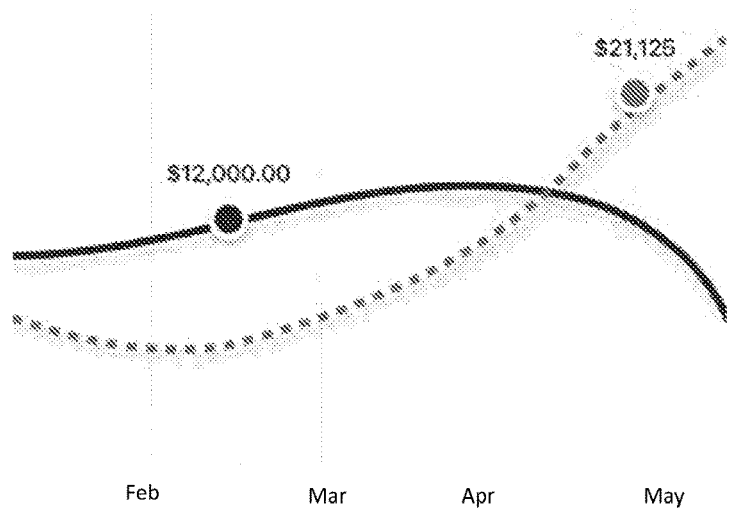
Figure 13:
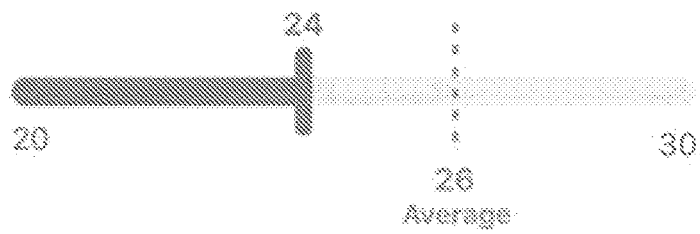

FIG. 13 illustrates a GUI for providing business suggestions, according to one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Many of the example embodiments and implementations described herein contemplate interactions engaged in by a user with a computing device and/or one or more communication devices and/or secondary communication devices.

In accordance with embodiments of the invention, the terms "managing entity system" or "entity system" may include any organization that processes financial transactions including, but not limited to, financial institutions, credit unions, savings and loan associations, card associations, settlement associations, investment companies, stock brokerages, resource management firms, insurance companies and the like. In some embodiments, a "financial institution" as used herein may include commercial banks, thrifts, federal and state savings banks, savings and loan associations, credit unions, investment companies, insurance companies and the like. In some embodiments, the financial institution may allow a customer to establish an account with the financial institution. In some embodiments, the system of the present invention may be embodied into a resource entity system. In alternate embodiments, the system of the present invention (i.e., supplemental resources processing system) may be an independent system in communication with the resource entity system.

In accordance with embodiments of the present invention, an "account" or "resource pool" may be the relationship that the customer has with the financial institution. Examples of accounts include a deposit account, such as a transactional account (e.g. a financial account), a savings account, an investment account, a money market account, a time deposit, a demand deposit, a pre-paid account, a credit account, a non-monetary customer account that includes only personal information associated with the customer, or the like. An account may be associated with and/or maintained by a financial institution.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

FIG. 1 illustrates a unified enterprise digital desktop platform system environment 100, in accordance with embodiments of the present invention. FIG. 1 provides the system environment 100 for providing an interactive real-time digital hub, desktop, dashboard, or the like, for providing products and services to users associated with an enterprise (e.g., a business, a corporation, an organization, a consortium, or the like), as well as to provide alerts, notifications, status reports, and functionality related to financial and security actions.

As illustrated in FIG. 1, the digital desktop system 107 is operatively coupled, via a network 101 to the computing device(s) 104, the third party entity systems 108, and to the managing entity system 106. In this way, the digital desktop system 107 may send information to and receive information from the computing device(s) 104, third party entity system 108, and the managing entity system 106. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In some embodiments, the digital desktop system 107 may be owned and maintained by the entity associated with the managing entity system 106. In some embodiments, the digital desktop system 107 may be a part of the managing entity system 106. In some embodiments, the digital desktop system 107 may be an independent system.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, a user 102 may be an employee, consultant, independent contractor, executive, financial employee, accountant, financial representative, or the like, of the managing entity that controls the managing entity system 106. While a single user 102 is provided in FIG. 1, it should be known that multiple users may be included in the system environment 100, particularly in embodiments where multiple users are associated with an enterprise and the digital desktop system 107 is interacting with the multiple users. FIG. 1 also illustrates one or more computing device(s) 104. The computing device(s) 104 may be, for example, a desktop personal computer, business computer, business system, business server, business network, a mobile system, such as a cellular phone, smart phone, personal data assistant (PDA), laptop, or the like. The computing device(s) 104 may comprise an enterprise device 104a (e.g., a workstation, an enterprise laptop, an enterprise mobile device, or the like) that is owned or managed by an enterprise associated with the user 102, and/or a user device 104b that is owned or managed for personal use by the user 102. The user 102 may use multiple computing devices 104 as described herein, and each of the multiple computing devices 104. The computing device(s) 104 generally comprise a communication device 112, a processing device 114, and a memory device 116. The processing device 114 is operatively coupled to the communication device 112 and the memory device 116. The processing device 114 uses the communication device 112 to communicate with the network 101 and other devices on the network 101, such as, but not limited to the managing entity system 106, the third party entity system 108, and the digital desktop system 107. As such, the communication device 112 generally comprises a modem, server, or other device for communicating with other devices on the network 101.

The computing device(s) 104 comprise computer-readable instructions 120 and data storage 118 stored in the memory device 116, which in one embodiment includes the computer-readable instructions 120 of a digital desktop application 122. In some embodiments, the digital desktop application 122 allows a user 102 to communicate with the digital desktop system 107, the managing entity system 106, and the third party entity system 108. In some embodiments, the digital desktop application 122 may be provided by the digital desktop system 107. In some other embodiments, the digital desktop application 122 may be provided by the managing entity system 106 which comprises one or more add-ons or plugins provided by the digital desktop system 107.

As further illustrated in FIG. 1, digital desktop system 107 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the event system 108, the managing entity system 106, and the computing device(s) 104. As such, the communication device 146 generally comprises a modem, server, or other device for communicating with other devices on the network 101.

As further illustrated in FIG. 1, the digital desktop system 107 comprises computer-readable instructions 154 stored in the memory device 150, which in one embodiment includes the computer-readable instructions 154 of a digital desktop application 158. In some embodiments, the memory device 150 includes data storage 152 for storing data related to the system environment 100, but not limited to data created and/or used by the digital desktop application 158.

In one embodiment of the digital desktop system 107 the memory device 150 stores a digital desktop application 158. Furthermore, the resource pool application system 107, using the processing device 148 codes certain communication functions described herein. In one embodiment, the computer-executable program code of an application associated with the digital desktop application 158 may also instruct the processing device 148 to perform certain logic, data processing, and data storing functions of the application. In some embodiments, the digital desktop application 158 of the digital desktop system 107 comprises one or more instructions to perform one or more processes described herein. The processing device 148 is configured to use the communication device 146 to communicate with and ascertain data from the managing entity system 106, the third party entity system 108, and/or computing device(s) 104.

As illustrated in FIG. 1, the managing entity system 106 is connected to the computing device(s) 104, the third party entity system 108, and digital desktop system 107. The managing entity system 106 has the same or similar components as described above with respect to the computing device(s) 104 and the digital desktop system 107 (or, as described above, may control the digital desktop system 107). The managing entity system 106 may include a managing entity application which may be an online banking application, digital wallet application, financial services application, financial security application, reporting application, entitlement application, and/or the like. In some embodiments, the interactive digital hub provided by the digital desktop system 107 may be a part of the managing entity application. The managing entity system 106 may be any financial institution which provided one or more supplemental resources to the customers (e.g., user 102) upon performing one or more actions.

As illustrated in FIG. 1, the third party entity system 108 is connected to the digital desktop system 107, computing device(s) 104, and managing entity system 106. The third party entity system 108 has the same or similar components as described above with respect to the computing device(s) 104 and the managing entity system 106. While only one third party entity system 108 is illustrated in FIG. 1, it is understood that multiple third party entity systems may make up the system environment 100. The digital desktop system 107 may communicate with the third party entity system 108 to receive data feeds, communicate with governmental agencies, to provide or receive reports, to provide or receive authentication or verification information, or the like.

It is understood that the servers, systems, and devices described herein illustrate one embodiment of the invention. It is further understood that one or more of the servers, systems, and devices can be combined in other embodiments and still function in the same or similar way as the embodiments described herein. The digital desktop system 107 may generally include a processing device communicably coupled to devices as a memory device, output devices, input devices, a network interface, a power source, one or more chips, and the like. The digital desktop system 107 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. The memory device may store any of a number of applications or programs which comprise computer-executable instructions/ code executed by the processing device to implement the functions of the digital desktop system 107 described herein.

As further explained below, embodiments of the invention provide unified enterprise digital desktop platform that allows for easy integration of various services to a user by providing various service in a unified graphical user interface (GUI). For example, the invention allows a user to easily onboard new accounts and services by allowing upload of forms, easy fill out applications, data gathering from other services, etc. The system also allows the user to switch to different enterprise applications within the GUI based on single authorization. For example, once the user has entered authentication information to enter the GUI, the user can seamlessly access various services based on the initial authentication.

In an alternative embodiment, the invention may use authentication/digital security scoring, whereby certain functions with the applications may require added or reauthentication. In this manner, the user can use general lower threat risk-services using the initial authentication, but may be required to reauthenticate for more secure sensitive services in the application.

In one embodiment, the user can customize the GUI to provide various applications frequently used. The user may create a business version and a personal version of the GUI, depending on whether they are operating the business or handling personal banking issues.

They system may also provide a document/record vault, whereby a user may store various important documents and information.

In some embodiments, the invention may provide various analysis tools to the user for their business and/or personal accounts. These tools may use historical data from the user's accounts, as well as data from other like users. The tools may provide business comparisons with other businesses in terms of invoice strategies, accounts receivables, marketing strategies, cash flow strategies, loans and credit lines, and the like, and provide recommendations to the user about various tools to implement, strategies, marketing services, etc, that can be employed.

In some embodiments, the system may also provide geo-location services to assist the user in a particular location, such as various banking opportunities, marketing opportunities, regulations associated with a specific area, and the like to assist the user.

In general, the invention provides a GUI with unified resources for a user to various accounts, tools, services, etc. It allows the various services and tools to be integrated for seamless transition between services for the user. For example, the user may view account information and also receive alerts regarding invoices to be paid, invoices to be sent, administrative authorizations to approve, and the like. All such services and notifications and authorizations can be handled through the one GUI. The user is not forced to open/access each service to receive the information.

In this regard, the system gathers relevant notifications, alerts, deadlines, tasks from the various applications identified by the user in the GUI, and can provide such notifications, alerts, deadlines, tasks to the user in the GUI, so that the user can address these from the GUI level.

Referring now to FIG. 2, a flowchart is provided to illustrate one embodiment of a process 200 for providing a unified enterprise digital desktop platform, in accordance with embodiments of the invention. In some embodiments, the process 200 may include block 202, where the system identifies two or more enterprise applications associated with an enterprise. As used herein, the term "enterprise application" refers to a service, a mobile application, a financial institution product, or the like, that are provided by (or via) a managing entity (e.g., a financial institution) and that can be accessed from a unified digital desktop application (e.g., a digital dashboard, or the like) on one or more computing devices.

Examples of enterprise applications include, but are not limited to, security checklist or checkup applications, cost analysis applications, administrator visibility applications, anti-money laundering and/or know your customer ("KYC") applications, regulatory and/or compliance applications, custom reporting applications (e.g., a proprietary alert engine), financial institution communication applications, transaction applications, and the like.

The security checklist or checkup application may comprise a user interface within which a user can check the security parameters, security requirements, security features, and a status of the enterprise (or business units within the enterprise) is meeting the security parameters. This security application may additionally include one or more steps that can be taken to mitigate any security parameters that are not currently met (or not fully met), along with timeline to completion information, approval requirements, and testing mechanics for determining whether the security parameter has subsequently been met. This security checklist or checkup application may be presented to the user as a section within a preferences tab or area of a digital desktop, as described in more detail with respect to block 208.

The benefits of the security checklist or checkup application include the ability to assist a user, and an enterprise as a whole, become comfortable with the security status of their systems while adopting a new mobile or virtual platform (e.g., the digital desktop application). By presenting information about the security parameters of the entity, a user (e.g., information security specialist, compliance specialist, or the like) or the entity in general, can receive a quick and concise overview of where the enterprise stands on security measures. For example, a security report card, which provides grades and/or color coded scores, can be a component of this security checklist or checkup application, and therefore provide a quick visual security checklist reference for a user.

Another enterprise application may comprise a cost analysis application that provides predictive data analytics, as well as product, service, and/or strategy recommendations based on the predictive data analytics. For example, the cost analysis application may analyze historical transactions of the enterprise (or by individual users or lines of business within the enterprise) to determine whether the historical payment strategies are efficient and/or the most appropriate long term strategies. The payment types can be analyzed for each historical transaction to determine whether alternate payment types should be used for certain transaction types.

When a recommended transaction strategy is determined, the cost analysis application may be configured to automatically transmit a pop-up notification (or other notification) to any user of the enterprise that has requested a transaction in a manner that falls outside of the recommended transaction strategy. This notification may comprise an explanation as to why the recommended transaction strategy is a better solution, and links or instructions for conducting the requested transaction using the recommended transaction strategy.

Furthermore, the cost analysis application may include a foreign exchange feature that analyzes transactions made in (or conversions to or from) currencies of jurisdictions outside of a main jurisdiction of an enterprise. For example, if the system determines that the enterprise is making spot payments to a foreign enterprise, the system may identify and recommend an alternate approach, such as buying and/or selling the currency of the foreign enterprise. To this end, the system may include the promotion of research around foreign exchange and products and solutions associated with that research. The system may review which countries the transactions are going to and the amounts involved (e.g., breaking the amounts into tiers). The system can then find ways to make the foreign exchanges more seamless for the individual user or the enterprise as a whole by determining a better technique or method of payment to use based on the country and/or amount information, as well as jurisdictional rules and regulations (e.g., tax regulations).

In some embodiments, an enterprise application may comprise an administrator visibility application. An administrator visibility application may provide visibility for an administrator with respect to its users' entitlements, as well as to make the entitlement process faster and easier by providing a holistic and aggregated application for viewing and controlling the entitlements. For example, an administrator for a particular line of business may have visibility into the entitlements and/or approval abilities held by each of its users within that line of business, as well as to the devices or functionalities that are associated with that line of business. The administrator visibility application may additionally include functionality to allow the administrator to change the entitlements or approval abilities of its users in real time.

In some embodiments, a user may request a particular entitlement or approval ability (e.g., to approve a transaction above a particular amount, to draw down on a line of credit, to receive access to a particular building or workstation, to receive access to a software application or online portal, or the like) through the digital desktop platform. This request will then trigger the administrator visibility application to display a notification or alert to the computing device being used by the administrator, where the notification or alert explains the request (e.g., provides information about an associated task, the requesting user, enterprise policy information related to the task or the user, or the like) and provides one or more selectable actions that can be taken by the administrator. The one or more selectable actions may be to change the entitlement of the requesting user to meet the request, to deny the request, to approve a transaction without changing the entitlements of the requesting user, to transfer the request to another user (e.g., a supervisor of the requesting user and/or the administrator) along with selectable approval or denial icons, or the like.

Furthermore, the administrator visibility application may analyze the entitlements and approvals of all users associated with a particular administrator, and/or the enterprise as a whole, and identify one or more entitlements that appear to be missing for certain users or entitlements that likely are not necessary for certain users. The administrator visibility application may then transmit an alert or notification to the computing device being used by the administrator to recommend actions and/or facilitate changes to the entitlements for each of these certain users.

The administrator visibility application may additionally or alternatively provide an administrative reporting functionality that allows the administrator to quickly and concisely provide reports to managers, regulatory agencies, consultants, or the like, by pulling the entitlement information and aggregating the entitlement information into pre-programmed reporting templates.

The enterprise applications may include anti-money laundering applications, which may include KYC applications. These applications may receive new customer requests for an enterprise and compare received information against KYC databases and/or anti-money laundering statistics or information to determine whether a new customer can automatically be verified, or whether a specialist of the enterprise or the managing entity system should be alerted or contacted for approval or follow-up measures.

Regulatory and compliance applications of the enterprise applications may be used by a user of the enterprise to determine whether features of the enterprise meet regulatory and compliance requirements and/or to report the status of the enterprise features with respect to regulatory and/or compliance requirements. In embodiments where the system determines that a regulatory or compliance feature has not been met, the system may determine one or more actions that can or should be taken to mitigate or resolve the issue and transmit an alert to an appropriate user of the enterprise with descriptions of the issue and the actions that can or should be taken.

The enterprise applications may additionally or alternatively include custom reporting features, which may comprise a proprietary alert engine, hereinafter the "alert engine." The alert engine may include a preferences section where a user can establish a type of alert, a frequency of alerts, thresholds for alerts, and the like, that the user would like to receive from the alert engine application. For example, the user may establish whether the user would like to receive alerts on a mobile device (or a specific mobile device), via an office workstation, via an online application, via email, via phone calls, via text messaging, via pop-up messages, or the like. The user can also personalize the frequency of alerts, which may include determining thresholds for when an alert should be sent, or by requiring that certain alerts over a certain time period be aggregated into a single alert that is sent at specific times during a day, week, month, or year.

The alert engine application may include recommendations along with its reporting functionality. For example, the system may analyze the operational analytics of certain users of the enterprise and provide a report along with the alert, where the report provides a background as to what the certain users have historically done, an explanation that an alternate functionality is available through the digital desktop application, and links or instructions for effecting the recommended change prompted by the alert. One sample report could be a notification that a specific user is depositing checks for the enterprise at a brick and mortar location, but the digital desktop application has mobile check deposit functionality which can be accessed by that specific user. The sample report could indicate whether the specific user currently has access to the mobile check deposit functionality and, if not, a prompt to grant the specific user with the appropriate permission to use the mobile check deposit functionality through the digital desktop application. Furthermore, the sample report may provide educational information about why the use of the recommended actions (here, the mobile check deposit functionality) is beneficial to the user and/or the enterprise as a whole.

The enterprise applications may, in some embodiments, include a financial institution communication application, which could be a feature within one or more of the other enterprise applications described herein. In this way, a user may communicate with an employee of a financial institution that provides services and/or products to the enterprise directly via the digital desktop application. The financial institution communication application may additionally include links to cause a computing device being used by the user to initiate a telephone call, a video call, or the like, with a specialist at the financial institution, in response to a request from the user. The financial institution communication application may additionally or alternatively include authentication functionality, where the user is able to provide authentication credentials (including biometric information) to the financial institution in response to requests from the financial institution.

The financial institution communication application may include certain financial products or services and/or functionality for conveying information about the products or services that the user may use. For example, the financial institution communication application may include transaction capabilities, lending capabilities, mobile check deposit capabilities, line of credit capabilities, wire transaction capabilities, transaction approval capabilities, and the like, in addition to any other capabilities provided by a digital desktop application (e.g., security checklist application, cost analysis application, administrator visibility application, KYC application, customized reporting application, or the like).

In some embodiments, the financial institution communication application includes educational features and material about available services and insight information of the financial institution. For example, the system may include educational information about the products and services provided by the financial institution, financial wellness information tailored to the enterprise, financial education media (e.g., podcasts, articles, blogs, webinars) that may be recommended or sponsored by the financial institution, client events, continuing education events, networking events, product education resources, and the like. In some embodiments, some of the educational features can be accessed directly within the application. In other embodiments, the system provides links or instructions for accessing the educational material from external websites or physical locations.

Finally, certain transaction capabilities (e.g., mobile check deposits, wire transfers, business-to-business transactions, deposit functionality, payroll functionality, line of credit functionality, and the like) can be included in a transaction application. As such, a user may execute one or more transactions through the transaction applications of a digital desktop application, and therefore would not need to access or utilize an alternate transaction application. Additionally, approval requests, entitlement requests, and the like that are associated with a user's requested transaction may be automatically transmitted to an administrator or manager in real time via the digital desktop application to be resolved in real time.

The enterprise applications may utilize machine learning and/or artificial intelligence systems (e.g., systems maintained by the managing entity) to perform any of the analysis, recommendation, and predictive analysis steps described herein.

In some embodiments, the process 200 includes block 204, where the system identifies a user associated with the enterprise. Each user of the enterprise may be identified or known by the system, including a line of business, employment position, and/or known entitlements or permissions associated with the user. As such, the system may determine identify an individual user that is accessing the digital desktop, and which device (or device type) the user is accessing the digital desktop from.

Additionally, in some embodiments, the process 200 includes block 206, where the system determines a relevancy value for each of the two or more enterprise applications with respect to the identified user. Based on the user information described in block 204, the system is able to rank or otherwise prioritize the enterprise applications based on expected need, historical use, recommended need, recommended use, managerial input, user preference input, or the like. These rankings can be based on a relevancy value that is determined based on the above-noted information or received as user input (or manger input).

The process 200 may also include block 208, where the system causes at least one computing device associated with the user to display information associated with the two or more enterprise applications as a unified digital desktop application. The most relevant (or all) enterprise applications may be presented on the computing device of the user based on the relevancy values (e.g., the most relevant or most used applications towards the top and/or the left side of the user interface, with the least relevant or least used applications towards the bottom and/or right side of the user interface. The enterprise applications may be presented in several ways including, but not limited to, icons, dropdowns, pages, tabs, windows, and the like, within a user interface of the computing device being used by the user.

In this way, the system can aggregate many applications with varied functionality into a single digital desktop that is tailored for particular users within an enterprise. This unified display allows for quick access to many facets of an enterprise, and therefore is especially beneficial to executives (e.g., CEOs and CFOs), treasury associates, financial staff, institutional investors, rideshare drivers, independent contractors, small business owners, and the like. By providing personalized access points for a particular user's enterprise, this system is additionally configurable to be able to switch between multiple accounts within and outside of the enterprise. For example, the CEO of the enterprise may have access to one executive account as well as a financial manager account for the enterprise, depending on the type of work or analysis that the CEO would like to perform at the time.

Additionally, the CEO may also be able to switch the account to a personal account with the same financial institution. In this way, the CEO is able to perform personal financial institution dealings while on the personal account and easily switch over to the corporate account when enterprise business needs to be conducted. This type of versatility is especially beneficial to all individuals that have personal accounts with the same financial institution that manages the enterprise for which the individual user works or manages. For example, a rideshare driver is able to manage its personal expenses and switch over to an enterprise account to manage the earnings from performing rideshare services, while maintaining separate accounts. The digital desktop application may be configured to seamlessly transition between the personal and enterprise accounts to maintain consistency and usability across the applications.

The digital desktop application additionally allows users to push content to other users of the enterprise. For example, a user may identify an entitlement that would benefit the user in carrying out a task for the enterprise. The user may then transmit a request via a template request form within the digital desktop application or by simply pushing a button that generates a populated form based on predetermined information about the user and the requested entitlement. The request is transmitted to an administrative agent that has the authority to grant or deny the request. As the administrative agent also has its own digital desktop application, the system can provide easy-to-use selectable icons, along with clear descriptions of the request and user and entitlement information, in a single alert. The administrative agent can then grant or deny the request in real time, where the decision is transmitted back to the digital desktop of the requesting user in real time, and any changes to entitlements or permissions are conducted in real time as well. By hosting all users of an enterprise, the system can identify which user(s) should receive certain notifications, alerts, or approval requests, and automatically transmit such messages to those identified individuals in an individualized or specialized manner.

The digital desktop application may be versatile, with the ability to provide information on several different types of devices including, but not limited to, enterprise workstations, desktop computers, laptop computers, smart phones, tablets, wearable devices, internet of things devices, and the like. Additionally, the digital desktop application can transfer (or "push") events or actions that are initiated on a first device to a second device. For example, a user may initiate a loan request via a text chat feature on the mobile device of the user, then transfer the interaction to a workstation device of the user.

Another benefit of the digital application desktop being available on multiple devices is that the digital application desktop can cause multiple devices to work together in real time to assist a user in executing a task. For example, if a user is interacting with an electronic kiosk (e.g., an ATM), the system can prompt the user with a request to cause a mobile phone of the user that is known to include the digital desktop application to display an interactive keyboard that is configured to receive input that can be sent to the electronic kiosk. Similarly, the system can cause the mobile device of the user to prompt the user to provide biometric information for the user's authorization to access a transaction portal of the digital desktop application via a desktop computer or other workstation without biometric analysis functionality.

As some enterprise functionality can require the input or sign-off of multiple users, the digital desktop application can be configured to allow for a "hand-off" of a session initiated by a first user of the enterprise to a second user of the enterprise, where both users are conducting the session via their respective digital desktop applications. In some such embodiments, the first user may identify the second user of the handoff. In other embodiments, the system can identify the second user based on a determination of the approval requirements for executing the session (e.g., execution of a transaction above an amount where the first user has approval) and an identification of one or more users of the enterprise that do have the permission or ability to fully execute the session. Similarly, a session may require the signatures of multiple users, and the system can therefore transmit signature requests to each of the designated signatories within the enterprise at once in real time via their respective digital desktop applications.

In some embodiments, the digital desktop application can be used to initiate or otherwise conduct an onboarding process for an enterprise, where this digital interaction is the first point of contact between the enterprise and the associated managing entity (e.g., a financial institution). In this way, once a user of the enterprise downloads the digital desktop application (or otherwise accesses the application via a web browser or other portal), the digital desktop application may provide a limited view with requests for any necessary information needed for onboarding the enterprise as a client of the managing entity. The limited functionality may include a communication application that can put a user in direct communication with the managing entity system, such that the managing entity can answer any questions or assist the user in signing up for additional features of the digital desktop application for the enterprise. As more information is provided to the managing entity, the digital desktop application can provide additional features based on the provided information. In this way, the digital desktop application is usable as soon as it is opened, and certain features like transaction applications, entitlement applications, and the like can be opened if/when financial account information and/or entitlement information is received from the enterprise.

In some embodiments, the process 200 includes block 210, where the system determines the occurrence of at an alert triggering event associated with the enterprise. As described above, the digital desktop application may include a reporting application or alert engine that is configured to transmit alerts to specific users in response to certain thresholds being met. These thresholds may established by the individual users themselves and/or determined based on historical interactions with the users. The triggering events may include issues or occurrences associated with the enterprise that should be reported and, in some embodiments, may include personalized reporting requirements or preferences of specific users (e.g., notification frequency preferences, notification type preferences, and the like).

Finally, in some embodiments, the process 200 includes block 212, where the system causes the at least one computing device associated with the user to display an alert notification in response to determining the occurrence of the alert triggering event. As described above, the alert notifications may additionally include information about the triggering event, links to educational information associated with the triggering events, and the like. For example, an alert associated with a request from an employee for a new entitlement may be presented to the user (e.g., an administrative agent), along with information about the user, the entitlement request, and selectable icons for approving or denying the entitlement request. In another example, the alert may comprise an alert that an employee is performing transactions in a particular manner that can be improved upon (e.g., based on a historical data analysis and analysis of alternative transaction methods). In such embodiments, the alert may include information about the current transaction method, information about recommended alternative transaction methods, educational information about the alternative transaction methods, and selectable icons for transmitting a notification to the employee to request or instruct a change to one of the alternative transaction methods along with the educational materials.

FIGS. 3-13 provide various examples of graphical user interface views according to various embodiments of the invention.

FIG. 3 discloses an example view of a graphical interface 300 displaying four enterprise applications available to the user (302-308). Some of the applications may be personal to the user, while others are associated with the user's business. The user has to select an appropriate application from the GUI for further interaction. For example, the user could access their personal accounts, make payments for themselves or their business, onboard new accounts, authorize others within their organization to access or perform operations, etc.

FIG. 4 provides a GUI that allows a user to set up an account 402 and onboard various information. It also provides various analytic tools 404 that the user may take advantage of with their business, such account engagement tools, business analytics, foreign currency exchange, and creation of banking account information.

FIG. 5 provides a GUI 500 that organizes various approvals associated with a user's business. GUI section 502 displays various pay approvals for employment payments from a treasury application, while GUI section 504 represents administrative approvals, such as whether or not to provide an employee access to data.

FIG. 6 provides a GUI 600 organizing various applications 602 associated with the user's business, such as account information, credit card management, merchant services, loans and credit lines, foreign exchange tools, and benefits. The GUI may also provide tips associated with like businesses 604, and other business tools, such as the illustrated cash flow management tool 606.

FIG. 7 provides a GUI 700 providing a user view into a series of task 708, alerts 702, 704, and account information 706. As illustrated, the user may receive an urgent alert 704 regarding account activity, such an unusual payment or a low funds alert, along with a number and option to call the user.

FIGS. 8 and 9 provide GUIs for the user to capture documents via camera, which are then either saved or converted to editable documents or forms. While the GUIs have various uses, some include invoice capture, corporate document capture, general forms, checks, etc. The system may include an evault or other service to retain documents.

FIG. 10 provides a GUI 1000 similar to the GUI 600 of FIG. 6 for organizing various applications associated with the user's business. In this embodiment, the GUI provides notifications 1002 to the user regarding invoices, payments, shipments, etc. associated with their business.

FIG. 11 provides a GUI that includes a payment scheduling window 1102 that allows the user to schedule payments. The GUI also includes a window 1104 for cash flow analysis of the user's account that reviews transaction history, pending and upcoming payments to determine cash flow for the account. The GUI also includes a window 1106 illustrating various costs associated with company operations, such as shipping costs gathered from the accounts for various transactions.

FIG. 12 provides a GUI 1200 for card management tools, including activity, monthly spend, credit lines, as well as spend breakdown.

FIG. 13 provides a GUI that provides business suggestions to a user based on like businesses, such as how to alter invoicing policies to affect cash flow.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system comprising a graphical user interface for providing a unified enterprise digital desktop platform, the system comprising:
    a memory device; and
    a processing device operatively coupled to the memory device, wherein the processing device is configured to execute computer-readable program code to:
        identify two or more enterprise applications associated with an enterprise;
        identify a user associated with the enterprise;
        identify an alert engine associated with the user, wherein the alert engine comprises a plurality of preferences from the user, the plurality of preferences from the user comprising a type of alert preference, a frequency of alerts preference, and a threshold for alerts preference;
        determine a relevancy value for each of the two or more enterprise applications with respect to the identified user;
        cause at least one computing device associated with the user to display information associated with the two or more enterprise applications in the graphical user interface as a unified digital desktop application;
        determine an occurrence of a threshold being met for one of the two or more enterprise applications;
        determine, in response to the threshold being met, an occurrence of an alert triggering event associated with one of the two or more enterprise applications associated with the enterprise;
        determine, by the alert engine, at least one recommendation for the alert triggering event, wherein the at least one recommendation comprises at least one of background of historical user activities for the alert triggering event, an explanation of an alternate functionality on the unified digital desktop application, at least one link for solving the alert triggering event, or at least one instruction for solving the alert triggering event;
        identify, by the alert engine, whether the alert triggering event meets at least one preference of the plurality of preferences from the user; and
        cause, based on the alert triggering event meeting at least one preference, the at least one computing device associated with the user to display an alert notification in the graphical user interface in response to determining the occurrence of the alert triggering event, wherein the alert notification further comprises the at least one recommendation for the alert triggering event.

2. The system according to claim 1, wherein said processing device is configured to execute computer-readable program code to transition views on the unified digital desktop application to one of the two or more enterprise applications based on a selection by the user.

3. The system according to claim 1, wherein at least one of said enterprise applications comprises an operation that requires that the user maintain an entitlement to perform the operation, and wherein said processing device is configured to execute computer-readable program code that prompts the user to forward the entitlement to a second user, whereby the second user can perform the operation on behalf of the user.

4. The system according to claim 1, wherein at least one of said enterprise applications comprises at least one operation and wherein said processing device is configured to execute computer-readable program code that prompts the user to forward the operation to a second user.

5. The system according to claim 1, wherein at least one of said enterprise applications requires authentication for access by the user, and wherein said processing device is configured to execute computer-readable program code that, following authentication by the user using authentication information and upon request by the user, transmits a current session in which the user is using an operation to a second processing device, along with the authentication information.

6. The system according to claim 1, wherein said processing device is configured to execute computer-readable program code that determines security status of one or more of said enterprise applications.

7. The system according to claim 6, wherein said processing device is configured to execute computer-readable program code that determines whether at least one of said enterprise applications is in compliance with security requirements.

8. The system according to claim 1, wherein said processing device is configured to execute computer-readable program code that predicts an outcome associated with the user implementing an operation of one or more of the enterprise applications.

9. The system according to claim 1, wherein said processing device is configured to execute computer-readable program code that monitors operation of one or more of the enterprise applications and determines whether each enterprise application is in compliance with a set of compliance rules.

10. The system according to claim 1, wherein said processing device is configured to execute computer-readable program code that allows the user to upload data in the form of documents for input into one or more of the enterprise applications.

11. A computer implemented method for providing a graphical user interface having a unified enterprise digital desktop platform, the method comprising:
    identifying two or more enterprise applications associated with an enterprise;
    identifying a user associated with the enterprise;
    identifying an alert engine associated with the user, wherein the alert engine comprises a plurality of preferences from the user, the plurality of preferences from the user comprising a type of alert preference, a frequency of alerts preference, and a threshold for alerts preference;
    determining a relevancy value for each of the two or more enterprise applications with respect to the identified user;
    causing at least one computing device associated with the user to display information associated with the two or more enterprise applications in the graphical user interface as a unified digital desktop application;
    determining an occurrence of a threshold being met for one of the two or more enterprise applications;
    determining, in response to the threshold being met, an occurrence of an alert triggering event associated with one of the two or more enterprise applications associated with the enterprise;
    determining, by the alert engine, at least one recommendation for the alert triggering event, wherein the at least one recommendation comprises at least one of background of historical user activities for the alert triggering event, an explanation of an alternate functionality on the unified digital desktop application, at least one link for solving the alert triggering event, or at least one instruction for solving the alert triggering event;
    identifying, by the alert engine, whether the alert triggering event meets at least one preference of the plurality of preferences from the user; and
    causing, based on the alert triggering event meeting at least one preference, the at least one computing device associated with the user to display an alert notification in the graphical user interface in response to determining the occurrence of the alert triggering event, wherein the alert notification further comprises the at least one recommendation for the alert triggering event.

12. The computer implemented method according to claim 11, further comprising transitioning views on the unified digital desktop application to one of the two or more enterprise applications based on a selection by the user.

13. The computer implemented method according to claim 11, wherein at least one of said enterprise applications comprises an operation that requires that the user maintain an entitlement to perform the operation, and wherein said method further comprises prompting the user to forward the entitlement to a second user, whereby the second user can perform the operation on behalf of the user.

14. The computer implemented method according to claim 11, wherein at least one of said enterprise applications comprises at least one operation and wherein said method further comprises prompting the user to forward the operation to a second user.

15. The computer implemented method according to claim 11, wherein at least one of said enterprise applications requires authentication for access by the user, and wherein said method further comprises, following authentication by the user using authentication information and upon request by the user, transmitting a current session in which the user is using an operation to a second processing device, along with the authentication information.

16. A computer program product comprising computer program code stored on a non-transitory computer-readable medium, said computer program product used for providing a graphical user interface for displaying a unified enterprise digital desktop platform, said computer program code comprising computer instructions to cause one or more computer processors to perform the following operations:
    identify two or more enterprise applications associated with an enterprise;
    identify a user associated with the enterprise;
    identify an alert engine associated with the user, wherein the alert engine comprises a plurality of preferences from the user, the plurality of preferences from the user comprising a type of alert preference, a frequency of alerts preference, and a threshold for alerts preference;
    determine a relevancy value for each of the two or more enterprise applications with respect to the identified user;
    cause at least one computing device associated with the user to display information associated with the two or more enterprise applications in the graphical user interface as a unified digital desktop application;
    determine an occurrence of a threshold being met for one of the two or more enterprise applications;

determine, in response to the threshold being met, an occurrence of an alert triggering event associated with one of the two or more enterprise applications associated with the enterprise;

determine, by the alert engine, at least one recommendation for the alert triggering event, wherein the at least one recommendation comprises at least one of background of historical user activities for the alert triggering event, an explanation of an alternate functionality on the unified digital desktop application, at least one link for solving the alert triggering event, or at least one instruction for solving the alert triggering event;

identify, by the alert engine, whether the alert triggering event meets at least one preference of the plurality of preferences from the user; and cause, based on the alert triggering event meeting at least one preference, the at least one computing device associated with the user to display an alert notification in the graphical user interface in response to determining the occurrence of the alert triggering event, wherein the alert notification further comprises the at least one recommendation for the alert triggering event.

17. The computer program product according to claim 16 further comprising instructions to cause one or more computer processors to transition views on the unified digital desktop application to one of the two or more enterprise applications based on a selection by the user.

18. The computer program product according to claim 16, wherein at least one of said enterprise applications comprises an operation that requires that the user maintain an entitlement to perform the operation, and wherein said computer program product further comprises instructions to cause one or more computer processors to prompt the user to forward the entitlement to a second user, whereby the second user can perform the operation on behalf of the user.

19. The computer program product according to claim 16, wherein at least one of said enterprise applications comprises at least one operation and wherein said computer program product further comprises instructions to cause one or more computer processors to prompt the user to forward the operation to a second user.

20. The computer program product according to claim 16, wherein at least one of said enterprise applications requires authentication for access by the user, and wherein said computer program product further comprises instructions to cause one or more computer processors to, following authentication by the user using authentication information and upon request by the user, transmit a current session in which the user is using an operation to a second processing device, along with the authentication information.

* * * * *